United States Patent
Catovic et al.

(10) Patent No.: US 12,389,300 B2
(45) Date of Patent: Aug. 12, 2025

(54) HANDOVER BETWEEN TERRESTRIAL NETWORK AND NONTERRESTRIAL NETWORK

(71) Applicant: QUALCOMM Incorporated, San Diego, CA (US)

(72) Inventors: Amer Catovic, San Diego, CA (US); Bharat Shrestha, San Diego, CA (US); Luis Fernando Brisson Lopes, Swindon (GB); Mungal Singh Dhanda, Slough (GB); Haris Zisimopoulos, London (GB); Umesh Phuyal, San Diego, CA (US); Lenaig Genevieve Chaponniere, La Jolla, CA (US); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 508 days.

(21) Appl. No.: 17/709,382

(22) Filed: Mar. 30, 2022

(65) Prior Publication Data
US 2023/0319671 A1   Oct. 5, 2023

(51) Int. Cl.
*H04W 36/32*   (2009.01)
*H04W 60/04*   (2009.01)
*H04W 76/19*   (2018.01)
*H04W 84/06*   (2009.01)

(52) U.S. Cl.
CPC .......... *H04W 36/32* (2013.01); *H04W 60/04* (2013.01); *H04W 76/19* (2018.02); *H04W 84/06* (2013.01)

(58) Field of Classification Search
CPC ..... H04W 36/32; H04W 76/19; H04W 60/04; H04W 84/06
USPC .......................................................... 370/331
See application file for complete search history.

(56) References Cited

U.S. PATENT DOCUMENTS

| | | | |
|---|---|---|---|
| 9,596,616 B2 * | 3/2017 | Jang | H04W 24/08 |
| 2011/0045834 A1 * | 2/2011 | Kim | H04W 36/0033 |
| | | | 455/445 |
| 2012/0094629 A1 * | 4/2012 | Liu | H04W 36/06 |
| | | | 455/435.1 |
| 2014/0141782 A1 * | 5/2014 | Rantala | H04W 36/0066 |
| | | | 455/436 |
| 2017/0195926 A1 * | 7/2017 | Iwai | H04W 36/12 |
| 2020/0029265 A1 * | 1/2020 | Choquette | H04B 7/18528 |

(Continued)

OTHER PUBLICATIONS

"Hussein, Wireless Communication System and Method for Handling Wireless Communication Enhancing Handover, Jan. 23, 2019, EP 3432642" (Year: 2017).*

(Continued)

*Primary Examiner* — Kevin C. Harper
(74) *Attorney, Agent, or Firm* — QUALCOMM Incorporated

(57) ABSTRACT

Certain aspects of the present disclosure provide a method of wireless communication by a user equipment (UE). The method generally includes performing a mobility procedure to establish a connection in a target radio access technology (RAT) while maintaining a context established in a source RAT, wherein one of the source RAT or target RAT is a terrestrial network (TN) RAT and the other is a non-terrestrial network (NTN) RAT and sending a tracking area update (TAU) request after establishing the connection in the target RAT.

22 Claims, 17 Drawing Sheets

(56) References Cited

U.S. PATENT DOCUMENTS

| | | | | |
|---|---|---|---|---|
| 2021/0120465 | A1* | 4/2021 | Zhu | H04W 36/00835 |
| 2021/0127310 | A1* | 4/2021 | Lee | H04W 36/08 |
| 2021/0410107 | A1* | 12/2021 | Park | H04W 76/28 |
| 2022/0022155 | A1* | 1/2022 | Wang | G01S 5/0284 |
| 2022/0353950 | A1* | 11/2022 | Chen | H04W 76/20 |
| 2023/0164643 | A1* | 5/2023 | Jeong | H04W 36/0022 370/331 |
| 2024/0080718 | A1* | 3/2024 | Wu | H04W 36/00226 |
| 2024/0121696 | A1* | 4/2024 | Jassal | H04W 36/1446 |

OTHER PUBLICATIONS

"Fujishiro, Radio Terminal, Base Station, and Method, Aug. 9, 2018, WO 2018143415" (Year: 2018).*

"Choi, Method and Device for Transmitting Control Information in Wireless Communication System, Oct. 8, 2015, WO 2015152553" (Year: 2015).*

3GPP TS 23.401, "3rd Generation Partnership Project; Technical Specification Group Services and System Aspects; General Packet Radio Service Enhancements for Evolved Universal Terrestrial Radio Access Network (E-UTRAN) Access (Release 17)", 3GPP, Mobile Competence Centre, 650, Route Des Lucioles, F-06921 Sophia-Antipolis Cedex, France, vol. SA WG2, No. V17.4.0, Mar. 23, 2022, pp. 1-451, XP052144754, p. 130, line 6, p. 157, line 32-33.

International Search Report and Written Opinion—PCT/US2023/062325—ISA/EPO—May 11, 2023.

Qualcomm Incorporated: "NB-IOT TN-NTN Mobility for CP-CioT", 3GPP TSG-SA WG2 Meeting #150-e, S2-2202004, 3rd Generation Partnership Project, Mobile Competence Centre, 650, Route Des Lucioles, F-06921 Sophia-Antipolis Cedex, France, vol. SA WG2, No. E-Meeting, Apr. 6, 2022-Apr. 12, 2022, Mar. 29, 2022, 3 Pgs, XP052132858, Title, p. 1—step 1, 2, lines 6-9, lines 1-2, p. 3, line 4, para 4.13.x, lines 11-13, para 4.13.x, lines 2-5, para 5.3.4b.X.

Qualcomm: "TN-NTN NB-IoT Mobility for CP-CioT", 3GPP TSG-WG SA2 Meeting #150E, S2-2202003, 3rd Generation Partnership Project, Mobile Competence Centre, 650, Route Des Lucioles, F-06921 Sophia-Antipolis Cedex, France, vol. SA WG2, No. Elbonia, Apr. 6, 2022-Apr. 12, 2022, Mar. 29, 2022, XP052132857, Item 2, p. 5, p. 5-6.

* cited by examiner

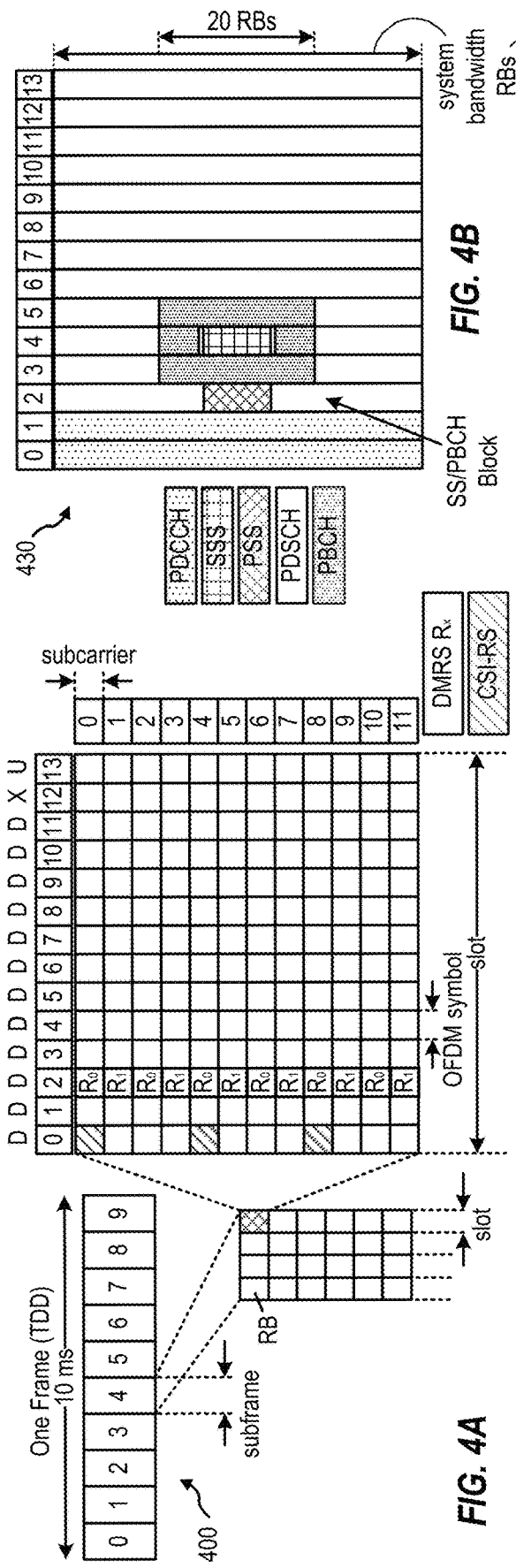
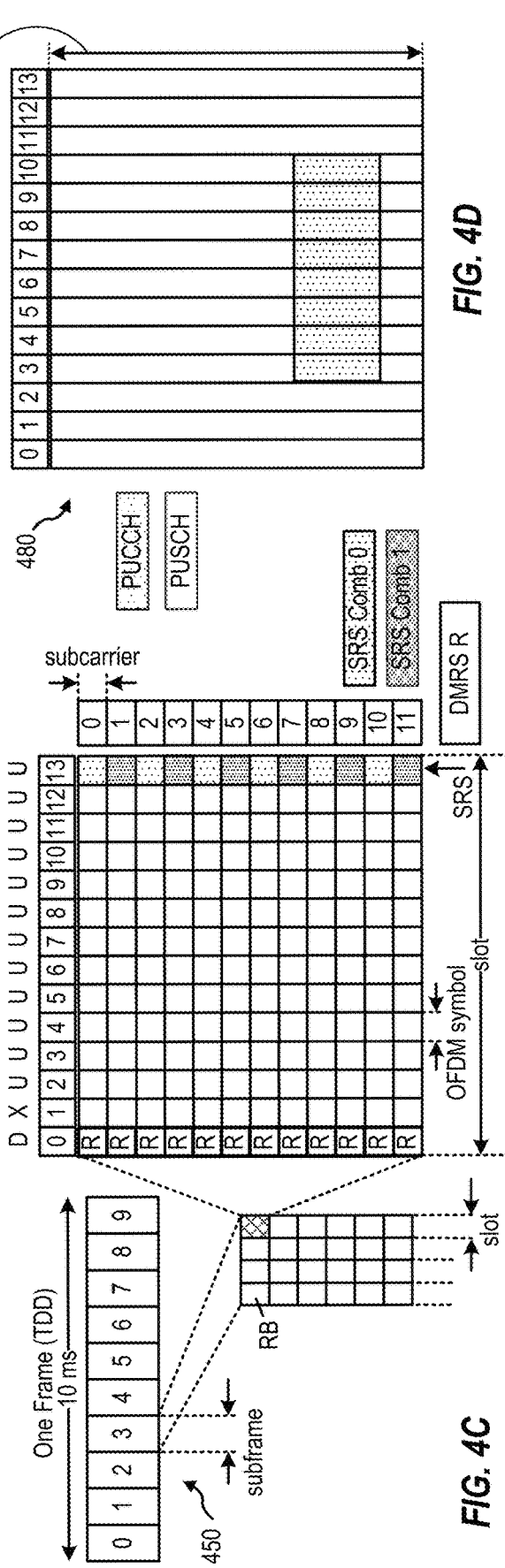
FIG. 4A  FIG. 4B  FIG. 4C  FIG. 4D

```
EPS update type value (octet 1, bit 1 to 3)

Bits 3 2 1
0 0 0    TA updating
0 0 1    combined TA/LA updating
0 1 0    combined TA/LA updating with IMSI attach
0 1 1    periodic updating
1 0 0
         These values may be interpreted as the TAU request is to
1 0 1            indicate handover (access change)

All other values are reserved.
```

FIG. 11 ns # HANDOVER BETWEEN TERRESTRIAL NETWORK AND NONTERRESTRIAL NETWORK

BACKGROUND

Field of the Disclosure

Aspects of the present disclosure relate to wireless communications, and more particularly, to techniques for transitioning a user equipment (UE) from a terrestrial network (TN) and a non-terrestrial network (NTN).

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communications by a user equipment (UE). The method includes performing a mobility procedure to establish a connection in a target radio access technology (RAT) while maintaining a context established in a source RAT, wherein one of the source RAT or target RAT is a terrestrial network (TN) RAT and the other is a non-terrestrial network (NTN) RAT; and sending a tracking area update (TAU) request after establishing the connection in the target RAT.

Another aspect provides a method of wireless communications by a network entity. The method includes transmitting a system information block (SIB) indicating support of radio resource control (RRC) connection re-establishment procedure of a UE between a target RAT and a source RAT, wherein one of the source RAT or target RAT is a TN RAT and the other is a NTN RAT; and participating in the RRC connection re-establishment procedure with the UE to maintain a context established in a source RAT.

Another aspect provides a method of wireless communications by a network entity. The method includes participating in a mobility procedure to transition a UE from a source RAT to a target RAT, wherein one of the source RAT or target RAT is a TN RAT and the other is a NTN RAT; retrieving a context of the UE from the source RAT; and forwarding data from the source RAT to the UE.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

FIG. 11 depicts an example structure for signaling a handover (access change) update type via a tracking area update (TAU) request.

DETAILED DESCRIPTION

Aspects of the present disclosure provide apparatuses, methods, processing systems, and computer-readable mediums for performing a handover of a user equipment (UE) between a terrestrial network (TN) and a non-terrestrial network (NTN).

In certain cases, an NTN may provide extended radio coverage to a user equipment (UE), for example, in rural areas where reliable coverage by a TN is not possible or is cost prohibitive. In some cases, when a UE is connected (in a radio resource control RRC connected state) and moves from an NTN to a TN (or vice-versa) a conventional connection re-establishment procedure may not be supported. As a result, the UE network context may be lost and the UE may have to establish a new connection in a target network, resulting in increased latency and interruption of service. Further, data that was available at the source network (which could otherwise be retrieved and forwarded using the UE context) may be lost.

A connection re-establishment typically occurs, for example, when a UE detects a radio link failure (RLF) or when a handover procedure fails. If the UE recovers, the UE initiates connection re-establishment procedures unless the UE recovers in a different radio access technology (RAT), in which case the UE gives up and goes to an idle state (e.g., RRC_IDLE). This is generally because the other RAT will not be "prepared" for the UE as it will not have the UE context, which includes the UE identity. NTNs and TNs are typically considered to be different RATs and, connection re-establishment when moving between NTNs and TNs is typically not supported.

Aspects of the present disclosure, however, provide techniques that allow a UE to perform RRC connection re-establishment when transitioning between an NTN and TN. As a result, the techniques provided herein may allow a UE to maintain network context and avoid having to establish a new connection in a target network. As a result, the techniques may allow a UE to reduce latency and avoid an interruption of service. Further, data that was available at the source network may be retrieved from the source network and forwarded to the UE.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
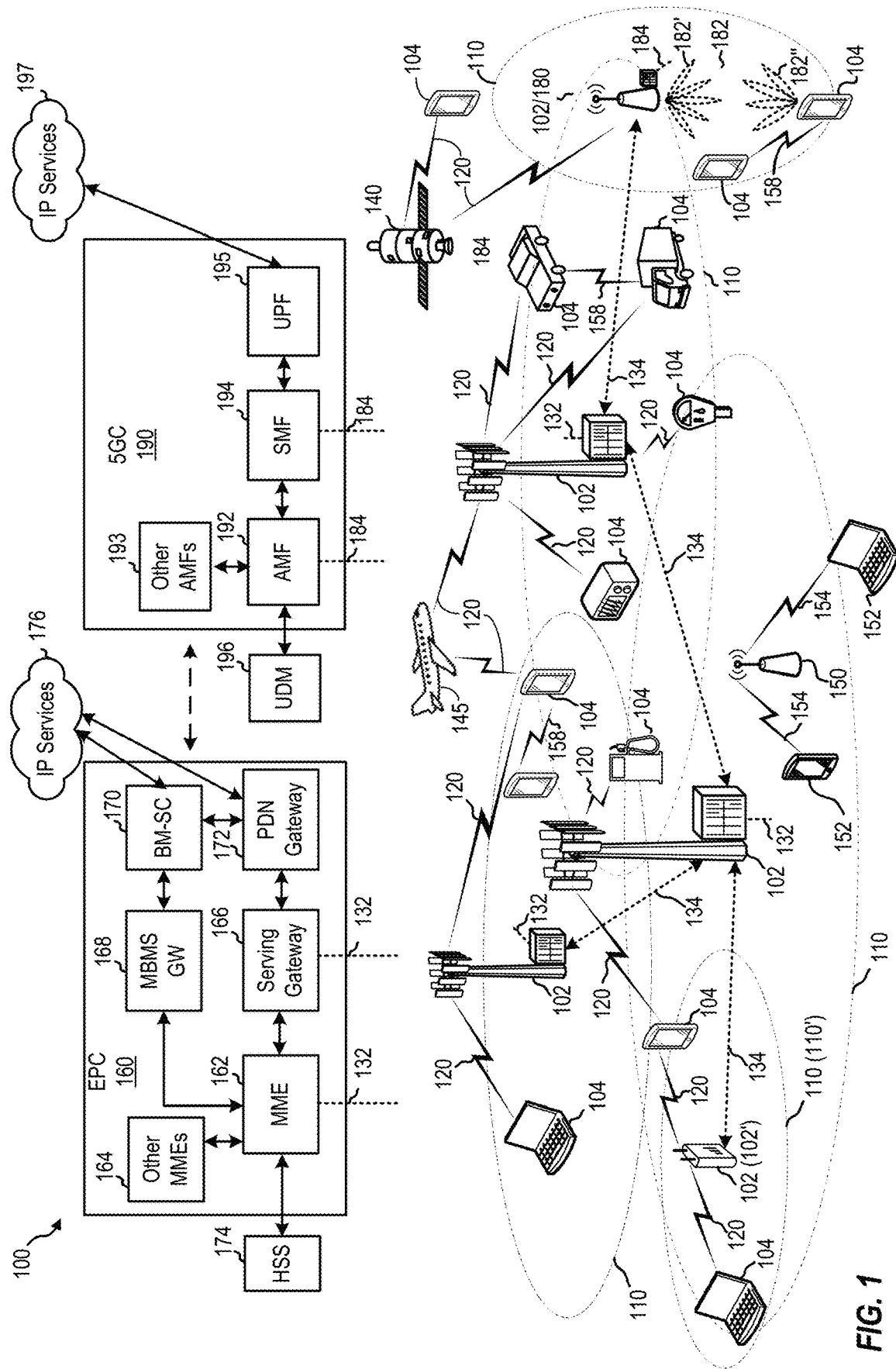
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
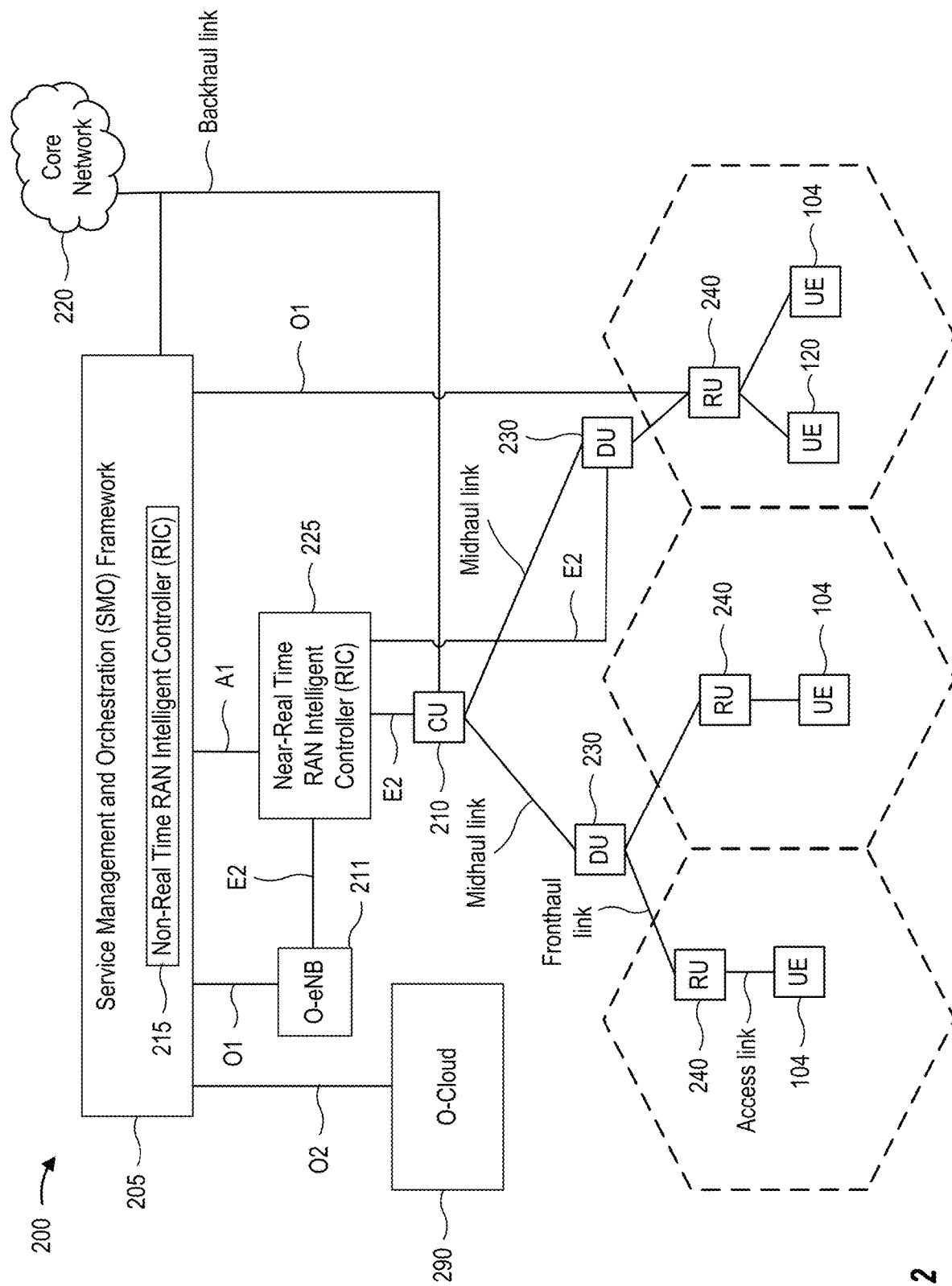
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
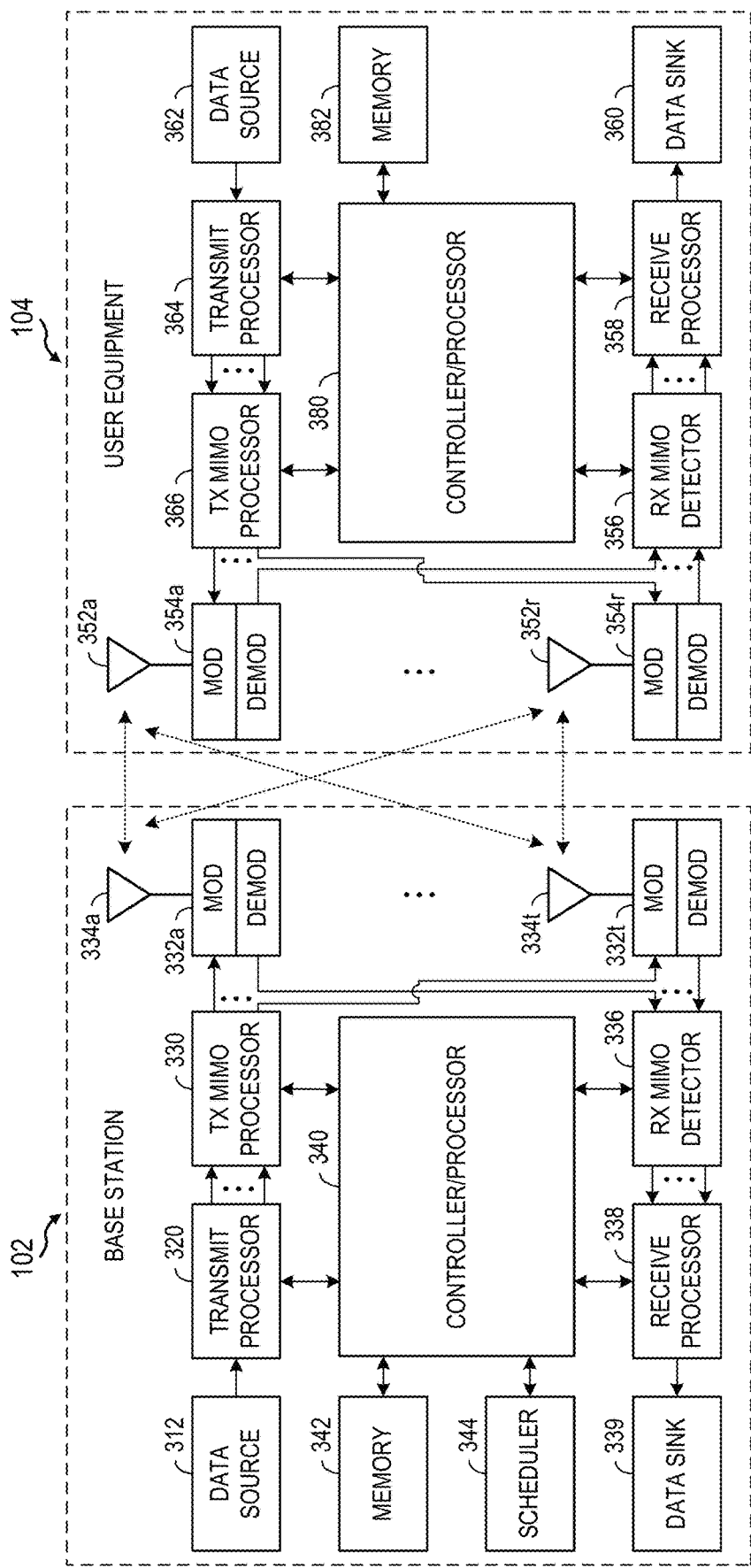
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Non-Terrestrial Network

Figure 5:
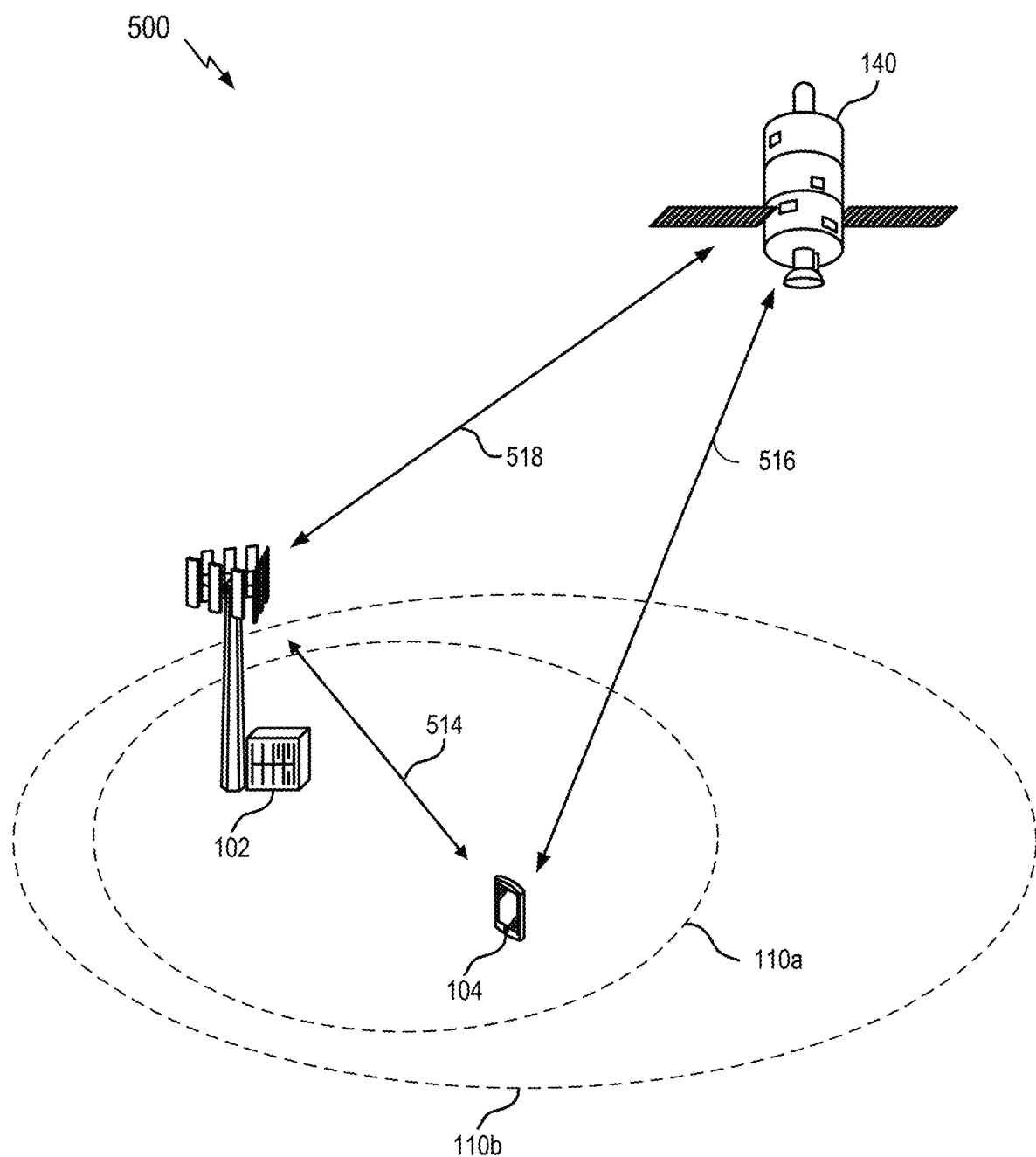
FIG. 5 depicts a diagram illustrating an example wireless communication network having a non-terrestrial network entity.

FIG. 5 illustrates an example of a wireless communications network 500 including a non-terrestrial network (NTN) entity 140 (which may be generally referred to as NTN 140), in which aspects of the present disclosure may be practiced. In some examples, the wireless communications network 500 may implement aspects of the wireless communication network 100. For example, the wireless communications network 500 may include BS 102, UE 104, and the non-terrestrial network entity 140, such as a satellite. BS 102 may serve a coverage area or cell 110a in cases of a terrestrial network, and non-terrestrial network entity 140 may serve the coverage area 110b in cases of a nonterrestrial network (NTN). Some NTNs may employ airborne platforms (e.g., a drone or balloon) and/or spaceborne platforms (e.g., a satellite).

The non-terrestrial network entity 140 may communicate with the BS 102 and UE 104 as part of wireless communications in an NTN. In cases of a terrestrial network, the UE 104 may communicate with the BS 102 over a communication link 514. In the case of NTN wireless communications, the non-terrestrial network entity 140 may be a serving cell for the UE 104 via a communication link 516. In certain aspects, the non-terrestrial network entity 140 may act as a relay (or a remote radio head) for the BS 102 and the UE 104. For example, the BS 102 may communicate with the non-terrestrial network entity 140 via a communication link 518, and the non-terrestrial network entity may relay signaling between the BS 102 and UE 104 via the communication links 516, 518.

Aspects Related to Handover Between TN and NTN

Figure 6:
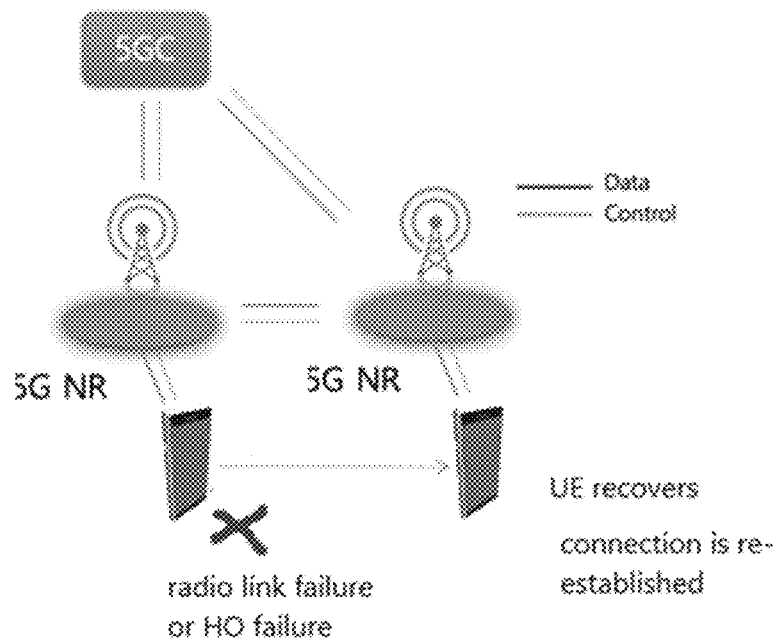
FIG. 6 depicts an example conventional mobility scenario.

As noted above, when a UE is connected (RRC_CONNECTED state) and moves within the same radio access technology (RAT), such as 5G in the example shown in FIG. 6, a connection re-establishment occurs, for example, when the UE detects radio link failure or when the handover procedure fails. If the UE recovers, the UE initiates connection re-establishment procedures and the target is able to retrieve any pending data from the source, using the UE context, and forward it to the UE.

Figure 7:
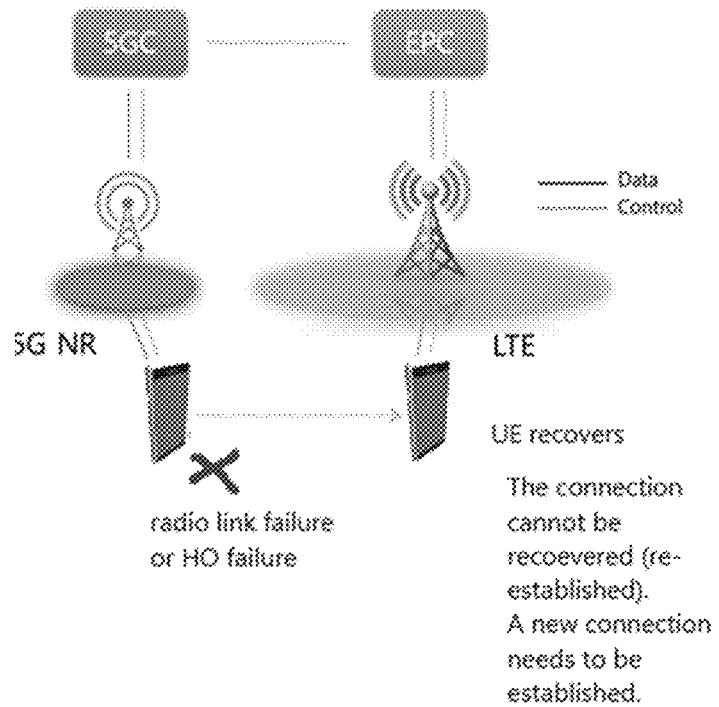
FIG. 7 depicts an example conventional multi-RAT mobility scenario.

When the UE is connected and moves from one radio access technology (RAT) to another, as in the example shown in FIG. 7, the connection re-establishment procedure is typically not supported. In such cases, when the UE recovers in a different RAT, the UE typically gives re-establishment procedures and goes to RRC_IDLE. This is because the target RAT will not have the UE context of the UE (e.g., including the UE identity).

Figure 8:
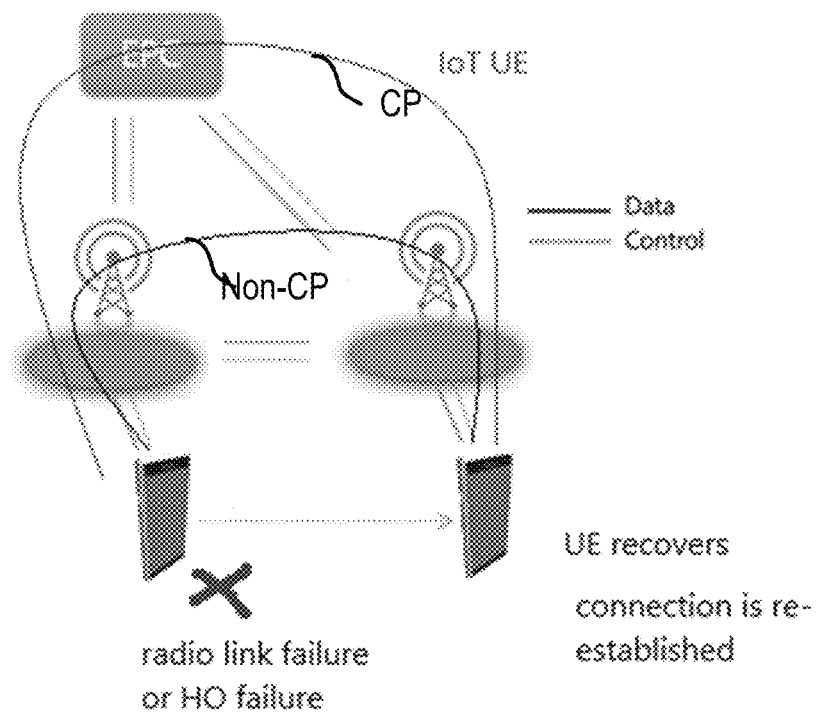
FIG. 8 depicts an example mobility scenario between RATs that share a common core network (CN).

As shown in FIG. 8, for certain devices, such as a non-control plane (CP)-cellular internet of things (CIoT) UE, connection re-establishment may be handled in the radio network. In such cases, the core network (CN) may not be aware of connection re-establishment if it succeeds.

As also illustrated, for CP-CIoT UE, on the other hand, connection re-establishment is handled in the core network. For CP-CIoT UE there may be no radio network access security. The security may be handled in the core network. So the core NW handles the security context and the related identities, and its preservation upon re-establishment. Also, any pending data packets may be forwarded to the UE by the CN upon connection re-establishment.

In conventional systems, for CP-CIoT UE, the connection re-establishment is still not supported upon RAT change. Typically, different RATs are connected to different core networks and there is no support for connection re-establishment across different core NWs.

Figure 9:
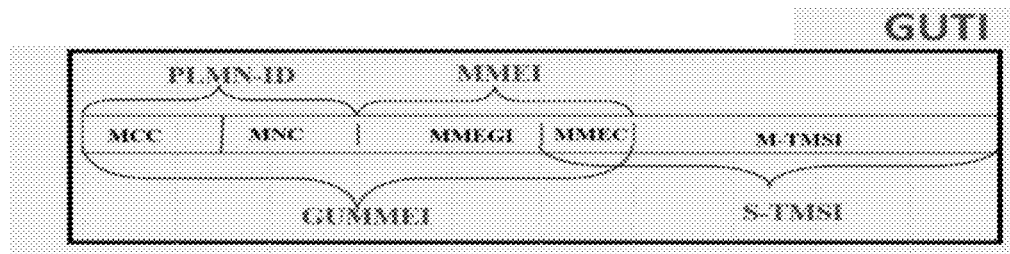
FIG. 9 depicts an example Global Unique Temporary Identifier (GUTI) format.

Upon recovering from an RLF, the CP-CIoT UE may send an RRC Connection Re-establishment Request message including the UE identity, such as a serving temporary mobile subscriber identity (S-TMSI). As illustrated in FIG. 9, the S-TMSI may be embedded in (and extracted from) a Global Unique Temporary Identifier (GUTI). S-TMSI generally refers to an identifier assigned by an MME, which is unique within an MME pool. There may be an indication in the SIB indicating whether RRC connection Reestablishment using S-TMSI is allowed or not. MME authenticates the UE based on the security parameters included in the message (ul-NAS-MAC and ul-NAS-Count).

As noted above, RRC connection re-establishment is typically not supported upon RAT change. In some cases, though, there may be less reason for this lack of support than in conventional systems. For example, in Rel-17, an internet of things (IoT) non-terrestrial network (NTN) RAT is specified, which generally defines a satellite access network for IoT devices.

Although formally defined as another RAT (mostly due to core network aspects e.g. Quality of Service (QoS), charging etc.), in some ways IoT NTN RAT may not really a different RAT.

Figure 10:
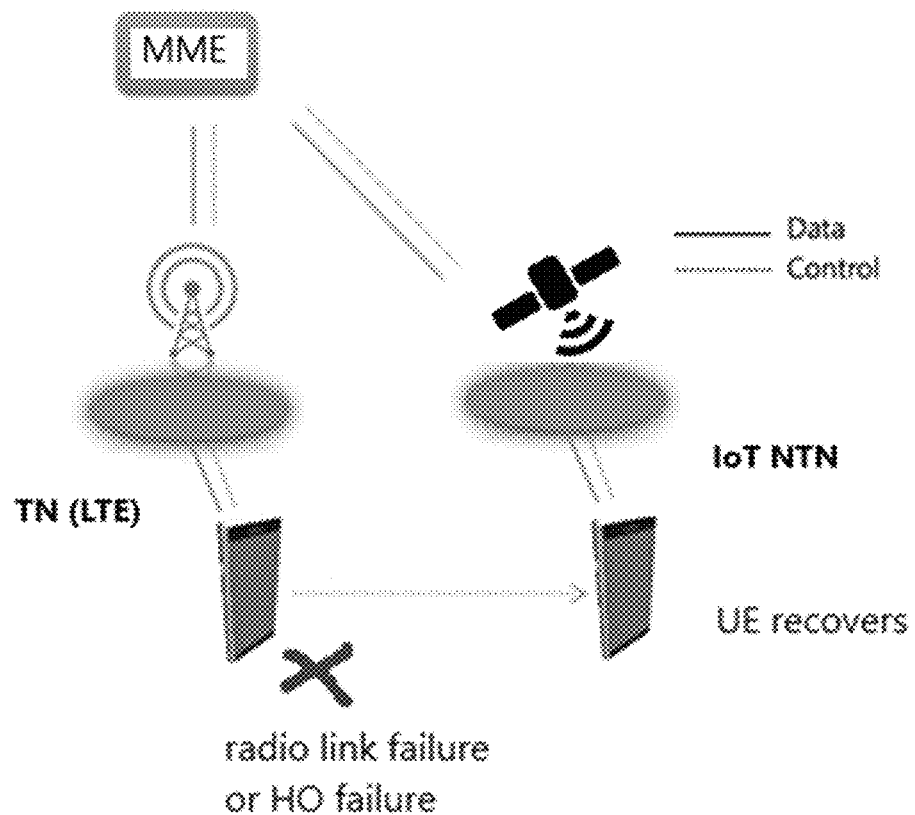
FIG. 10 depicts an example mobility scenario of a UE between a terrestrial network (TN) and a non-terrestrial network (NTN), in which aspects of the present disclosure may be applied.

Therefore, as illustrated in FIG. 10, it may be possible for IoT terrestrial network (TN) and IoT NTN RAT to be served by the same core network (i.e. same Evolved Packet Core (EPC) mobility management entity (MME)). In this case, the conventional reasons for not allowing RRC connection re-establishment for IoT UE upon RAT change may no longer exist. In other words, UE context may still be kept in the same MME or MME pool, even when moving between NT and NTN. Thus, in this case, there seems to be no reason to not allow RRC connection re-establishment for CP CIoT UE upon RAT change (IoT TN-to-IoT NTN or vice versa).

IoT TN RAT and IoT NTN RAT can (and likely will) be deployed in different tracking areas (TA) that are not in the same Tracking Area Identity (TAI) list (i.e. registration area). This means the UE may need to perform a TA update (TAU) upon RAT change. The MME may assign a new Serving Temporary Mobile Subscriber Identity (S-TMSI, sometimes referred to as a shortened TMSI) to the UE in the target RAT and, in such cases, one of the potential benefits of re-establishing the Radio Resource Control (RRC) connection may vanish. The old security context cannot be preserved if the UE identity has changed. Any pending data forwarding may still benefit from connection re-establishment.

There are various options for how to allow RRC connection re-establishment for a UE (e.g., a CP CIoT UE), upon RAT change (e.g., from IoT TN-to-IoT NTN or vice versa), in accordance with aspects of the present disclosure.

For example, according to a first option, a UE may perform RRC connection re-establishment using an old S-TMSI upon inter-RAT (IRAT) change from IoT TN to IoT NTN, followed by TAU request. In such cases, the purpose of the TAU request may be to update the TA list. If the MME is not the same, the (target) RAN may intercept the RRC re-establishment procedure (messages) and send the RRC Connection Setup message to the UE.

Potential benefits of this approach are that the pending data can be forwarded, and it may result in no Non-Access Stratum (NAS) layer impact.

In some cases, the IoT NTN RAN may broadcast a System Information Block (SIB) indication indicating whether RRC re-establishment using s-TMSI is supported upon RAT change. If the re-establishment using s-TMSI is allowed, the UE may be allowed to send a RRC connection re-establishment request. In some cases, a UE may attempt RRC re-establishment using s-TMSI only if it detects a SIB indicating this is supported.

In some cases, upon recovery, a UE may establish a new RRC connection in a target (TN or NTN). In such cases, the UE may send a TAU request and uses a new code point indicating "handover" for the Update type IE in the TAU REQUEST message. For example, as illustrated in FIG. 11, there one of two previously unused code points ('100' and '101') in the Update type IE in the TAU REQUEST message may be used to indicate a handover or access change (e.g., a change from TN to NTN or vice-versa).

Based on the new update type, the MME may check for any pending data for the UE and forward that pending data (if found). The MME may identify the UE based on the S-TMSI extracted from the Global Unique Temporary Identifier (GUTI) received in the TAU REQUEST message (see FIG. 9).

Potential benefits of this approach, indicating an access change via a TAU request, include that pending data may be forwarded and there may be no RAN impact (e.g., no need for RRC connection re-establishment upon RAT change).

In some cases, if the MME is not the same, the MME may reject the TAU request. In some cases, if the MME is not the same, the MME may accept the TAU request as if it were sent with update type "mobility update." In such cases, pending data may not be forwarded in this case. This is consistent with conventional (legacy) behavior when unused code points are used for Update type IE in the TAU REQUEST message.

Example Operations of a User Equipment

Figure 12:
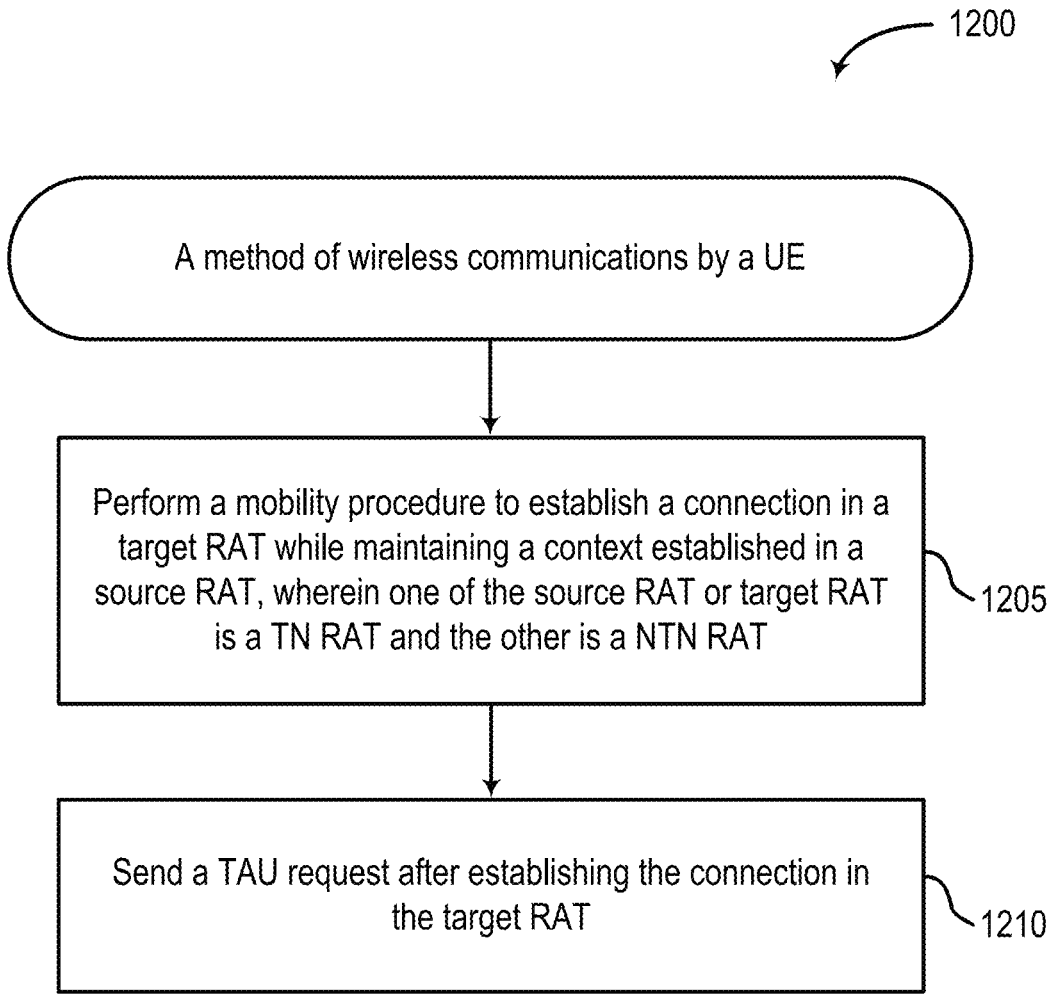
FIG. 12 depicts a method for wireless communications.

FIG. 12 shows a method 1200 for wireless communications by a UE, such as UE 104 of FIGS. 1 and 3.

Method 1200 begins at 1205 with performing a mobility procedure to establish a connection in a target RAT while maintaining a context established in a source RAT, where one of the source RAT or target RAT is a TN RAT and the other is a NTN RAT. In some cases, the operations of this step refer to, or may be performed by, mobility procedure circuitry as described with reference to FIG. 15.

Method 1200 then proceeds to step 1210 with sending a TAU request after establishing the connection in the target RAT. In some cases, the operations of this step refer to, or may be performed by, TAU request circuitry as described with reference to FIG. 15.

In some aspects, the UE comprises a CIoT wireless device. In some aspects, the UE performs the mobility procedure after detecting a RLF in the source RAT. In some aspects, the performing the mobility procedure comprises performing a RRC connection re-establishment procedure. In some aspects, the method 1200 further includes receiving an updated TA list in response to the TAU request. In some aspects, the method 1200 further includes receiving an RRC connection setup message if the target RAT is served by a different CN than the source RAT.

In some aspects, the RRC connection re-establishment procedure is performed using a S-TMSI. In some aspects, the method 1200 further includes receiving a SIB indicating the target RAT supports RRC connection re-establishment using an S-TMSI prior to performing the RRC connection re-establishment procedure using the S-TMSI.

In some aspects, the TAU request includes an update type indicating a handover from the source RAT to the target RAT. In some aspects, the update type comprises an EPS update type access change.

Figure 15:
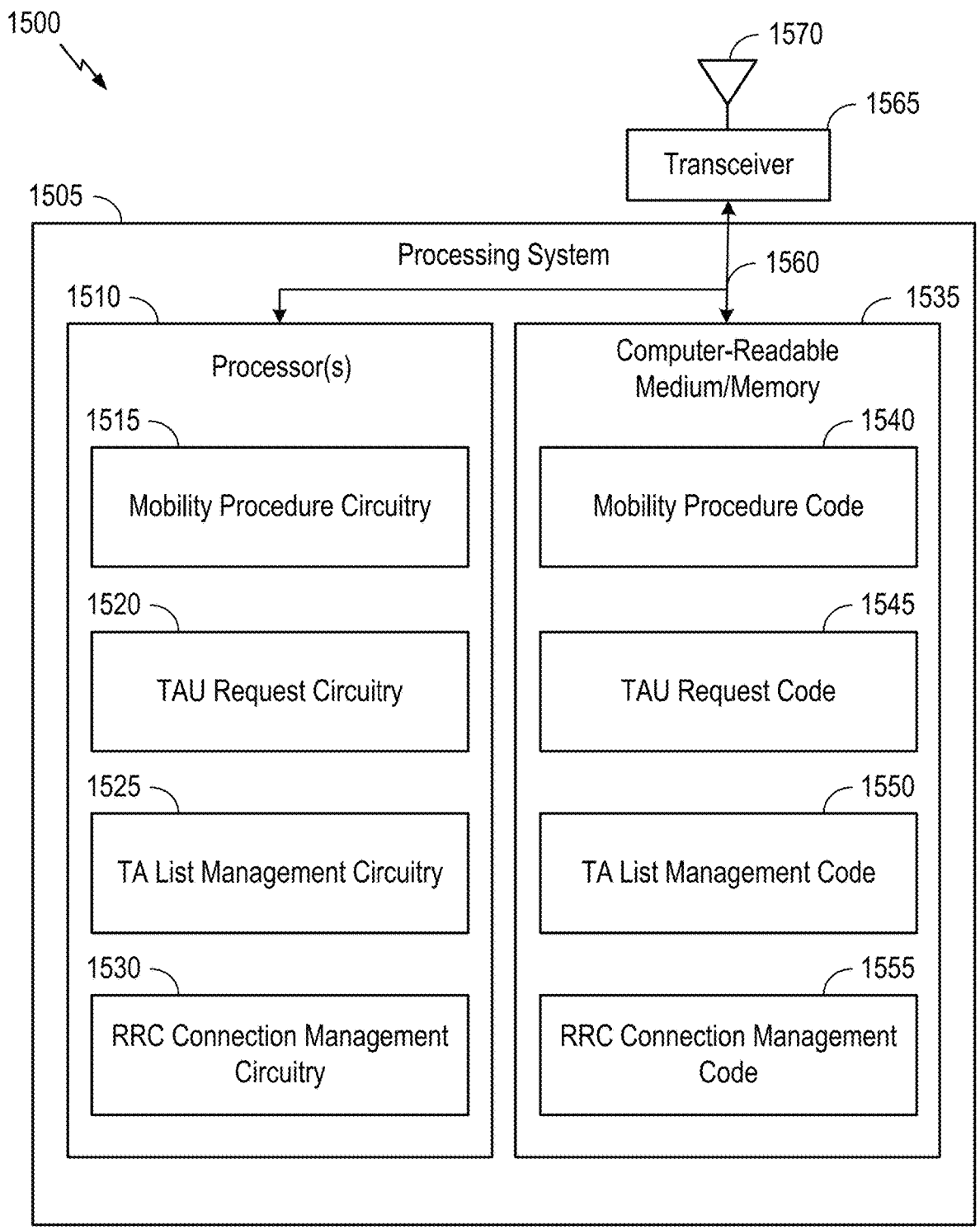
FIG. 15 depicts aspects of an example communications device.

In one aspect, method 1200, or any aspect related to it, may be performed by an apparatus, such as communications device 1500 of FIG. 15, which includes various components operable, configured, or adapted to perform the method 1200. Communications device 1500 is described below in further detail.

Note that FIG. 12 is just one example of a method, and other methods including fewer, additional, or alternative steps are possible consistent with this disclosure.

Example Operations of a Network Entity

Figure 13:
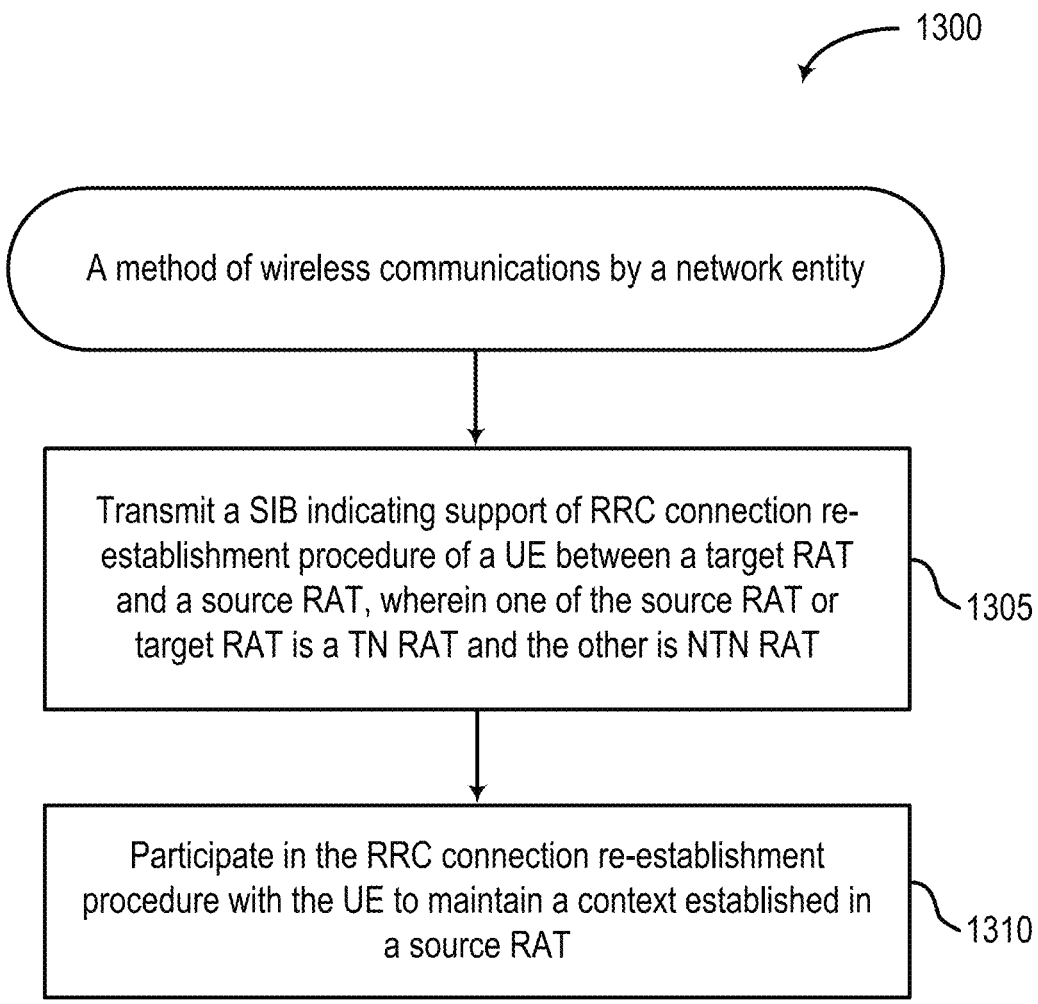
FIG. 13 depicts a method for wireless communications.

FIG. 13 shows a method 1300 for wireless communications by a network entity, such as BS 102 of FIGS. 1 and 3, or a disaggregated base station as discussed with respect to FIG. 2.

Method 1300 begins at 1305 with transmitting a SIB indicating support of RRC connection re-establishment procedure of a UE between a target RAT and a source RAT, where one of the source RAT or target RAT is a TN RAT and the other is NTN RAT. In some cases, the operations of this step refer to, or may be performed by, SIB transmission circuitry as described with reference to FIG. 16.

Method 1300 then proceeds to step 1310 with participating in the RRC connection re-establishment procedure with the UE to maintain a context established in a source RAT. In some cases, the operations of this step refer to, or may be performed by, RRC connection procedure circuitry as described with reference to FIG. 16.

In some aspects, the UE comprises a CIoT wireless device. In some aspects, if the target RAT is served by a different CN than the source RAT, the method 1300 further includes receiving an RRC reestablishment procedure message transmitted by the UE and transmitting a RRC connection setup message to the UE.

Figure 16:
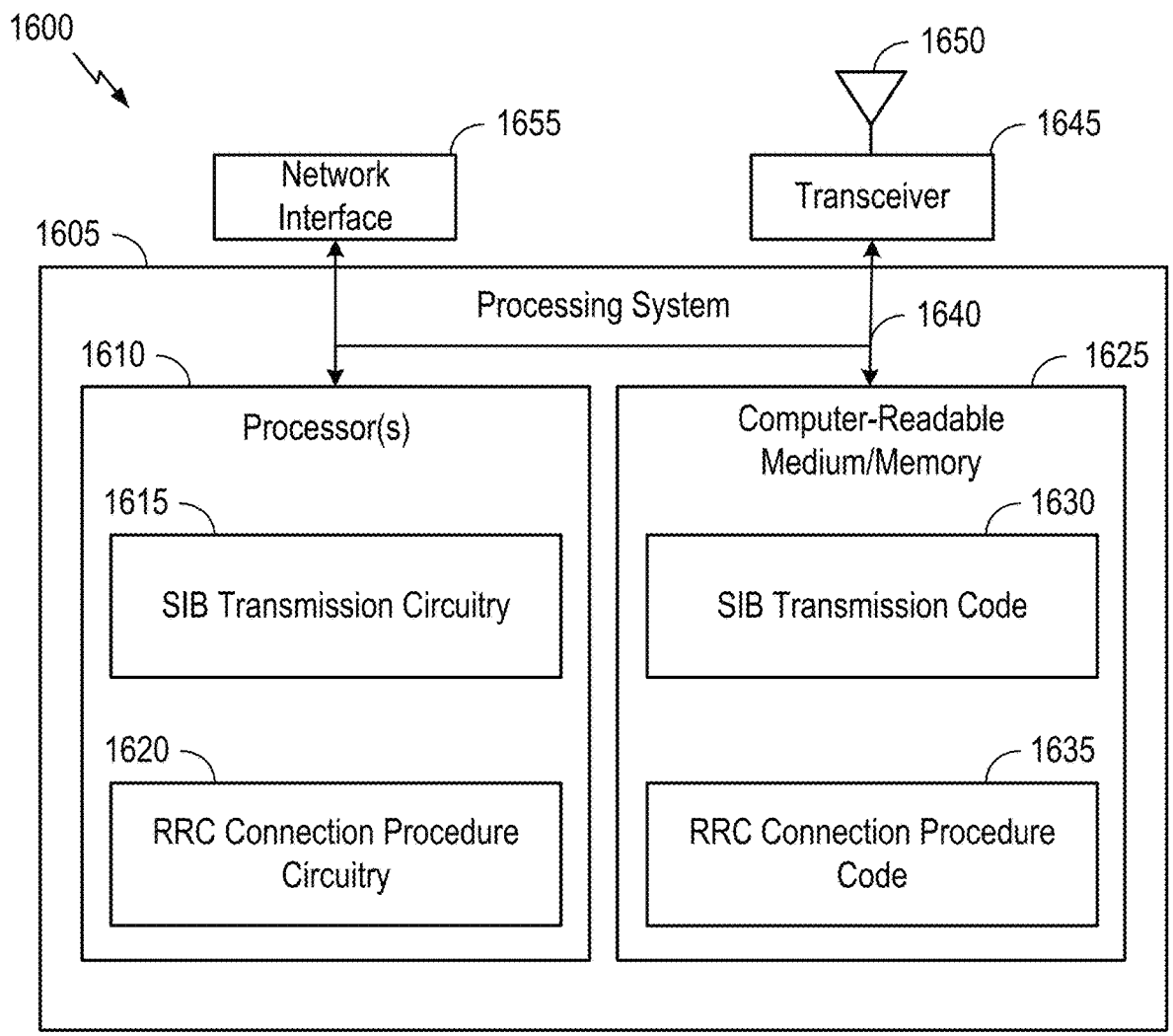
FIG. 16 depicts aspects of an example communications device.

In one aspect, method 1300, or any aspect related to it, may be performed by an apparatus, such as communications device 1600 of FIG. 16, which includes various components operable, configured, or adapted to perform the method 1300. Communications device 1600 is described below in further detail.

Note that FIG. 13 is just one example of a method, and other methods including fewer, additional, or alternative steps are possible consistent with this disclosure.

Figure 14:
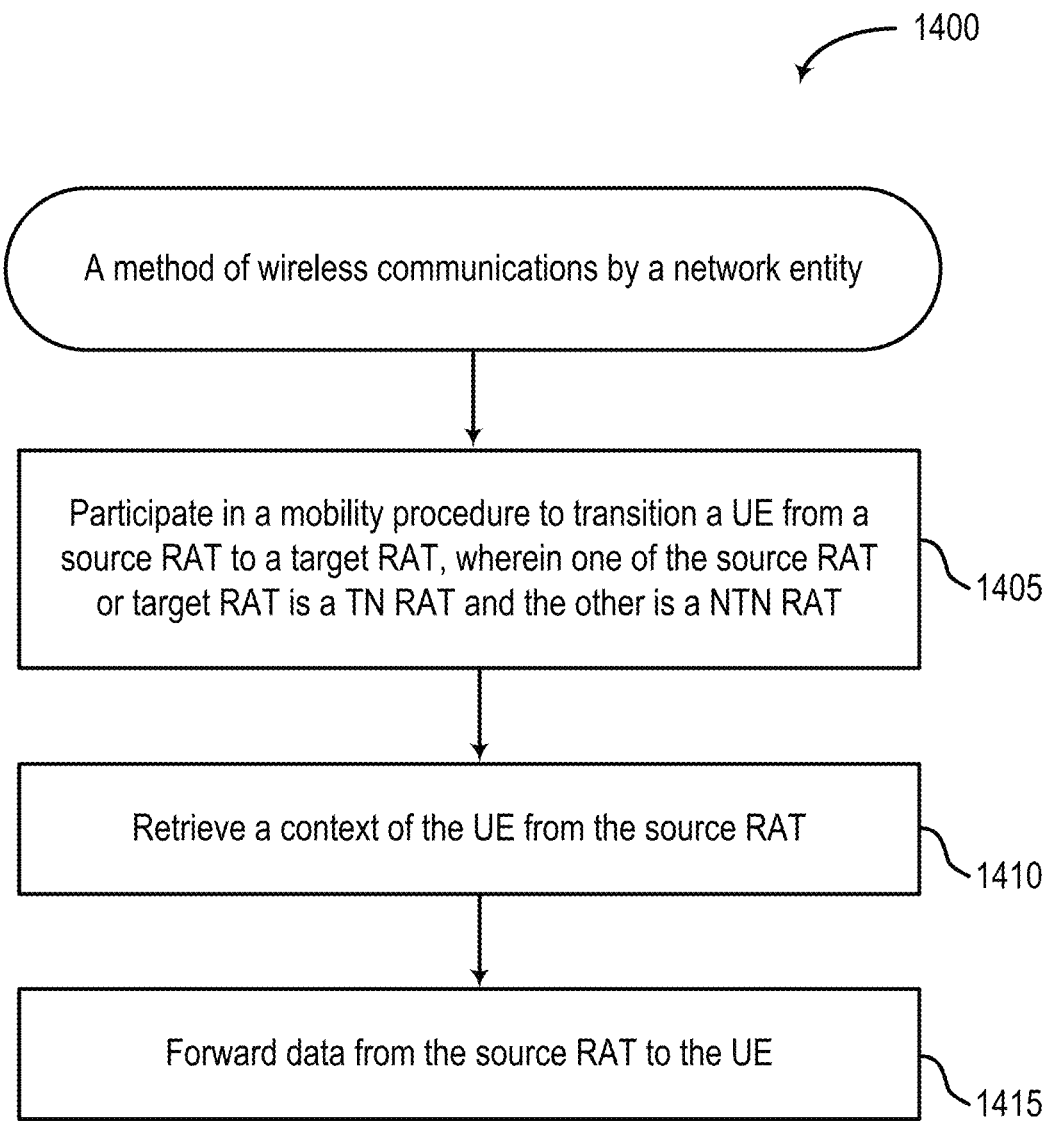
FIG. 14 depicts a method for wireless communications.

FIG. 14 shows a method 1400 for wireless communications by a network entity, such as BS 102 of FIGS. 1 and 3, or a disaggregated base station as discussed with respect to FIG. 2.

Method 1400 begins at 1405 with participating in a mobility procedure to transition a UE from a source RAT to a target RAT, where one of the source RAT or target RAT is a TN RAT and the other is a NTN RAT. In some cases, the operations of this step refer to, or may be performed by, UE mobility procedure circuitry as described with reference to FIG. 17.

Method 1400 then proceeds to step 1410 with retrieving a context of the UE from the source RAT. In some cases, the operations of this step refer to, or may be performed by, UE context processing circuitry as described with reference to FIG. 17.

Method 1400 then proceeds to step 1415 with forwarding data from the source RAT to the UE. In some cases, the operations of this step refer to, or may be performed by, data forwarding circuitry as described with reference to FIG. 17.

In some aspects, the UE comprises a CIoT wireless device. In some aspects, the mobility procedure comprises a RRC connection re-establishment procedure. In some aspects, the RRC connection re-establishment procedure is performed using a S-TMSI. In some aspects, the S-TMSI is used to retrieve the context.

In some aspects, the method 1400 further includes receiving a TAU request transmitted from the UE. In some aspects, the TAU request includes an update type indicating a handover from the source RAT to the target RAT. In some aspects, the update type comprises an EPS update type access change. Some examples of the method, apparatus, non-transitory computer readable medium, and system further include extracting a S-TMSI a in the TAU request. In some aspects, if the S-TMSI is not found when performing a context retrieval, the method 1400 further includes rejecting the TAU request or performing a backup TAU update with an update type other than the update type indicating the handover.

Figure 17:
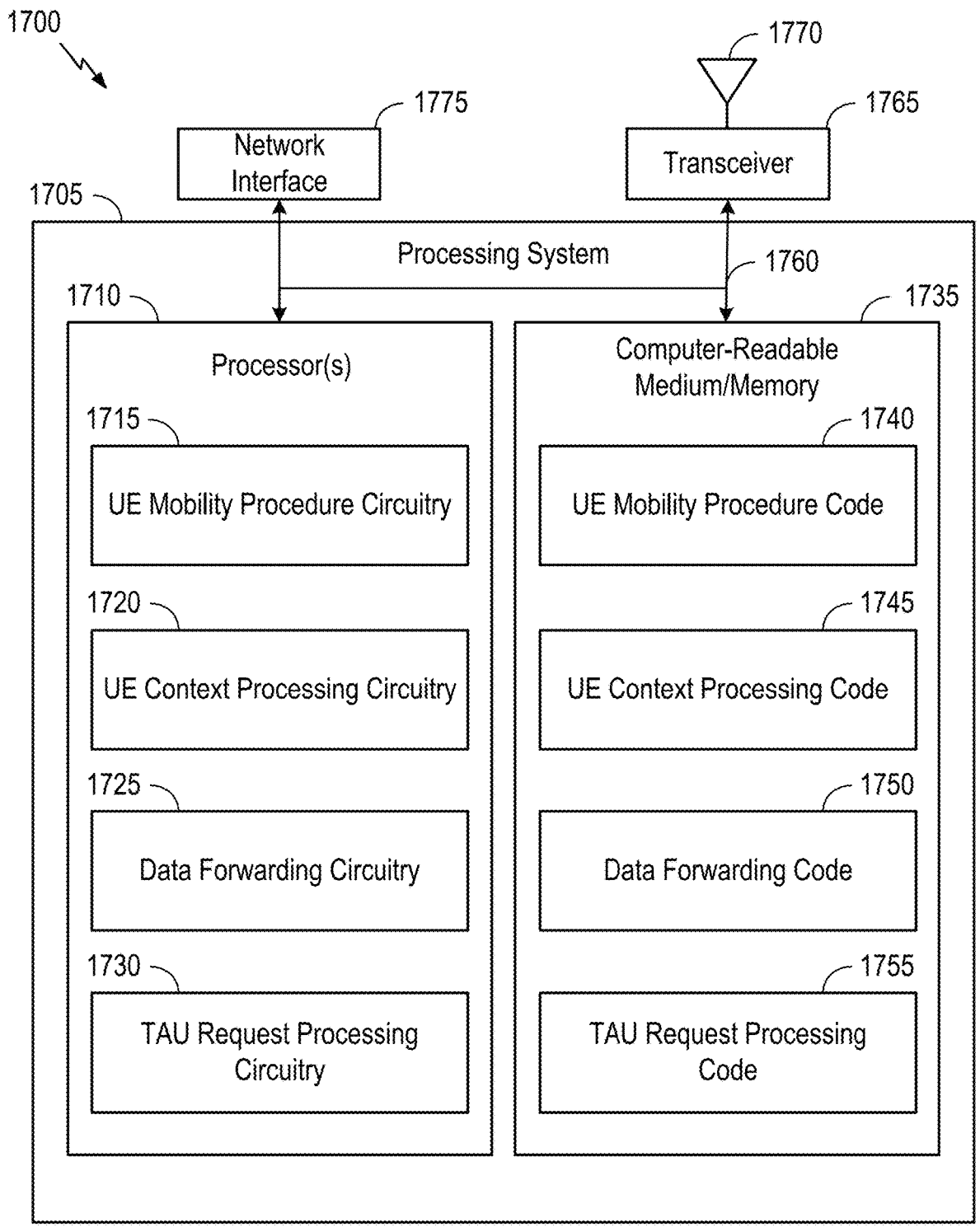
FIG. 17 depicts aspects of an example communications device.

In one aspect, method 1400, or any aspect related to it, may be performed by an apparatus, such as communications device 1700 of FIG. 17, which includes various components operable, configured, or adapted to perform the method 1400. Communications device 1700 is described below in further detail.

Note that FIG. 14 is just one example of a method, and other methods including fewer, additional, or alternative steps are possible consistent with this disclosure.

Example Communications Devices

FIG. 15 depicts aspects of an example communications device 1500. In some aspects, communications device 1500 is a user equipment, such as UE 104 described above with respect to FIGS. 1 and 3.

The communications device 1500 includes a processing system 1505 coupled to the transceiver 1565 (e.g., a transmitter and/or a receiver). The transceiver 1565 is configured to transmit and receive signals for the communications device 1500 via the antenna 1570, such as the various signals as described herein. The processing system 1505 may be configured to perform processing functions for the communications device 1500, including processing signals received and/or to be transmitted by the communications device 1500.

The processing system 1505 includes one or more processors 1510. In various aspects, the one or more processors 1510 may be representative of one or more of receive processor 358, transmit processor 364, TX MIMO processor 366, and/or controller/processor 380, as described with respect to FIG. 3. The one or more processors 1510 are coupled to a computer-readable medium/memory 1535 via a bus 1560. In certain aspects, the computer-readable medium/memory 1535 is configured to store instructions (e.g., computer-executable code) that when executed by the one or more processors 1510, cause the one or more processors 1510 to perform the method 1200 described with respect to FIG. 12, or any aspect related to it. Note that reference to a processor performing a function of communications device 1500 may include one or more processors 1510 performing that function of communications device 1500.

In the depicted example, computer-readable medium/memory 1535 stores code (e.g., executable instructions), such as mobility procedure code 1540, TAU request code 1545, TA list management code 1550, and RRC connection management code 1555. Processing of the mobility procedure code 1540, TAU request code 1545, TA list management code 1550, and RRC connection management code 1555 may cause the communications device 1500 to perform the method 1200 described with respect to FIG. 12, or any aspect related to it.

The one or more processors 1510 include circuitry configured to implement (e.g., execute) the code stored in the computer-readable medium/memory 1535, including circuitry such as mobility procedure circuitry 1515, TAU request circuitry 1520, TA list management circuitry 1525, and RRC connection management circuitry 1530. Processing with mobility procedure circuitry 1515, TAU request circuitry 1520, TA list management circuitry 1525, and RRC connection management circuitry 1530 may cause the communications device 1500 to perform the method 1200 described with respect to FIG. 12, or any aspect related to it.

Various components of the communications device 1500 may provide means for performing the method 1200 described with respect to FIG. 12, or any aspect related to it. For example, means for transmitting, sending or outputting for transmission may include transceivers 354 and/or antenna(s) 352 of the UE 104 illustrated in FIG. 3 and/or the transceiver 1565 and the antenna 1570 of the communications device 1500 in FIG. 15. Means for receiving or obtaining may include transceivers 354 and/or antenna(s) 352 of the UE 104 illustrated in FIG. 3 and/or the transceiver 1565 and the antenna 1570 of the communications device 1500 in FIG. 15.

According to some aspects, mobility procedure circuitry 1515 performs a mobility procedure to establish a connection in a target RAT while maintaining a context established in a source RAT, wherein one of the source RAT or target RAT is a TN RAT and the other is a NTN RAT. According to some aspects, TAU request circuitry 1520 sends a TAU request after establishing the connection in the target RAT.

In some aspects, the UE comprises a CIoT wireless device. In some aspects, the UE performs the mobility procedure after detecting a RLF in the source RAT. In some aspects, the performing the mobility procedure comprises performing a RRC connection re-establishment procedure.

According to some aspects, TA list management circuitry 1525 receives an updated TA list in response to the TAU request.

According to some aspects, RRC connection management circuitry 1530 receives an RRC connection setup message if the target RAT is served by a different CN than the source RAT. In some aspects, the RRC connection re-establishment procedure is performed using a S-TMSI. In some examples, RRC connection management circuitry 1530 receives a SIB indicating the target RAT supports RRC connection re-establishment using an S-TMSI prior to performing the RRC connection re-establishment procedure using the S-TMSI. In some aspects, the TAU request includes an update type indicating a handover from the source RAT to the target RAT. In some aspects, the update type comprises an EPS update type access change.

FIG. 16 depicts aspects of an example communications device 1600. In some aspects, communications device 1600 is a network entity, such as BS 102 of FIGS. 1 and 3, or a disaggregated base station as discussed with respect to FIG. 2.

The communications device 1600 includes a processing system 1605 coupled to the transceiver 1645 (e.g., a transmitter and/or a receiver) and/or a network interface 1655. The transceiver 1645 is configured to transmit and receive signals for the communications device 1600 via the antenna 1650, such as the various signals as described herein. The network interface 1655 is configured to obtain and send signals for the communications device 1600 via communication link(s), such as a backhaul link, midhaul link, and/or fronthaul link as described herein, such as with respect to FIG. 2. The processing system 1605 may be configured to perform processing functions for the communications device 1600, including processing signals received and/or to be transmitted by the communications device 1600.

The processing system 1605 includes one or more processors 1610. In various aspects, one or more processors 1610 may be representative of one or more of receive processor 338, transmit processor 320, TX MIMO processor 330, and/or controller/processor 340, as described with respect to FIG. 3. The one or more processors 1610 are coupled to a computer-readable medium/memory 1625 via a bus 1640. In certain aspects, the computer-readable medium/memory 1625 is configured to store instructions (e.g., computer-executable code) that when executed by the one or more processors 1610, cause the one or more processors 1610 to perform the method 1300 described with respect to FIG. 13, or any aspect related to it. Note that reference to a processor of communications device 1600 performing a function may include one or more processors 1610 of communications device 1600 performing that function.

In the depicted example, the computer-readable medium/memory 1625 stores code (e.g., executable instructions), such as SIB transmission code 1630 and RRC connection procedure code 1635. Processing of the SIB transmission code 1630 and RRC connection procedure code 1635 may cause the communications device 1600 to perform the method 1300 described with respect to FIG. 13, or any aspect related to it.

The one or more processors 1610 include circuitry configured to implement (e.g., execute) the code stored in the computer-readable medium/memory 1625, including circuitry such as SIB transmission circuitry 1615 and RRC connection procedure circuitry 1620. Processing with SIB transmission circuitry 1615 and RRC connection procedure circuitry 1620 may cause the communications device 1600 to perform the method 1300 as described with respect to FIG. 13, or any aspect related to it.

Various components of the communications device 1600 may provide means for performing the method 1300 as described with respect to FIG. 13, or any aspect related to it. Means for transmitting, sending or outputting for transmission may include transceivers 332 and/or antenna(s) 334 of the BS 102 illustrated in FIG. 3 and/or the transceiver 1645 and the antenna 1650 of the communications device 1600 in FIG. 16. Means for receiving or obtaining may include transceivers 332 and/or antenna(s) 334 of the BS 102 illustrated in FIG. 3 and/or the transceiver 1645 and the antenna 1650 of the communications device 1600 in FIG. 16.

According to some aspects, SIB transmission circuitry 1615 transmits a SIB indicating support of RRC connection re-establishment procedure of a UE between a target RAT and a source RAT, wherein one of the source RAT or target RAT is a TN RAT and the other is NTN RAT. According to some aspects, RRC connection procedure circuitry 1620 participates in the RRC connection re-establishment procedure with the UE to maintain a context established in a source RAT.

In some aspects, the UE comprises a CIoT wireless device. In some examples, if the target RAT is served by a different CN than the source RAT, RRC connection procedure circuitry 1620 receives an RRC reestablishment procedure message transmitted by the UE and transmits a RRC connection setup message to the UE.

FIG. 17 depicts aspects of an example communications device 1700. In some aspects, communications device 1700 is a network entity, such as BS 102 of FIGS. 1 and 3, or a disaggregated base station as discussed with respect to FIG. 2.

The communications device 1700 includes a processing system 1705 coupled to the transceiver 1765 (e.g., a transmitter and/or a receiver) and/or a network interface 1775. The transceiver 1765 is configured to transmit and receive signals for the communications device 1700 via the antenna 1770, such as the various signals as described herein. The network interface 1775 is configured to obtain and send signals for the communications device 1700 via communication link(s), such as a backhaul link, midhaul link, and/or fronthaul link as described herein, such as with respect to FIG. 2. The processing system 1705 may be configured to perform processing functions for the communications device 1700, including processing signals received and/or to be transmitted by the communications device 1700.

The processing system 1705 includes one or more processors 1710. In various aspects, one or more processors 1710 may be representative of one or more of receive processor 338, transmit processor 320, TX MIMO processor 330, and/or controller/processor 340, as described with respect to FIG. 3. The one or more processors 1710 are coupled to a computer-readable medium/memory 1735 via a bus 1760. In certain aspects, the computer-readable medium/memory 1735 is configured to store instructions (e.g., computer-executable code) that when executed by the one or more processors 1710, cause the one or more processors 1710 to perform the method 1400 described with respect to FIG. 14, or any aspect related to it. Note that reference to a processor of communications device 1700 performing a function may include one or more processors 1710 of communications device 1700 performing that function.

In the depicted example, the computer-readable medium/memory 1735 stores code (e.g., executable instructions), such as UE mobility procedure code 1740, UE context processing code 1745, data forwarding code 1750, and TAU request processing code 1755. Processing of the UE mobility procedure code 1740, UE context processing code 1745, data forwarding code 1750, and TAU request processing code 1755 may cause the communications device 1700 to perform the method 1400 described with respect to FIG. 14, or any aspect related to it.

The one or more processors 1710 include circuitry configured to implement (e.g., execute) the code stored in the computer-readable medium/memory 1735, including circuitry such as UE mobility procedure circuitry 1715, UE context processing circuitry 1720, data forwarding circuitry 1725, and TAU request processing circuitry 1730. Processing with UE mobility procedure circuitry 1715, UE context processing circuitry 1720, data forwarding circuitry 1725, and TAU request processing circuitry 1730 may cause the communications device 1700 to perform the method 1400 as described with respect to FIG. 14, or any aspect related to it.

Various components of the communications device 1700 may provide means for performing the method 1400 as described with respect to FIG. 14, or any aspect related to it. Means for transmitting, sending or outputting for transmission may include transceivers 332 and/or antenna(s) 334 of the BS 102 illustrated in FIG. 3 and/or the transceiver 1765 and the antenna 1770 of the communications device 1700 in FIG. 17. Means for receiving or obtaining may include transceivers 332 and/or antenna(s) 334 of the BS 102 illustrated in FIG. 3 and/or the transceiver 1765 and the antenna 1770 of the communications device 1700 in FIG. 17.

According to some aspects, UE mobility procedure circuitry 1715 participates in a mobility procedure to transition a UE from a source RAT to a target RAT, wherein one of the source RAT or target RAT is a TN RAT and the other is a NTN RAT. According to some aspects, UE context processing circuitry 1720 retrieves a context of the UE from the source RAT. According to some aspects, data forwarding circuitry 1725 forwards data from the source RAT to the UE.

In some aspects, the UE comprises a CIoT wireless device. In some aspects, the mobility procedure comprises a RRC connection re-establishment procedure. In some aspects, the RRC connection re-establishment procedure is performed using a S-TMSI. In some aspects, the S-TMSI is used to retrieve the context.

According to some aspects, TAU request processing circuitry 1730 receives a TAU request transmitted from the UE. In some aspects, the TAU request includes an update type indicating a handover from the source RAT to the target RAT. In some aspects, the update type comprises an EPS update type access change. In some examples, TAU request processing circuitry 1730 extracts a S-TMSI a in the TAU request. In some examples, if the S-TMSI is not found when performing a context retrieval, TAU request processing circuitry 1730 rejects the TAU request or performing a backup TAU update with an update type other than the update type indicating the handover.

Example Clauses

Implementation examples are described in the following numbered clauses:

Clause 1: A method of wireless communication by a UE, comprising: performing a mobility procedure to establish a connection in a target RAT while maintaining a context established in a source RAT, wherein one of the source RAT or target RAT is a TN RAT and the other is a NTN RAT; and sending a TAU request after establishing the connection in the target RAT.

Clause 2: The method of Clause 1, wherein the UE comprises a CIoT wireless device.

Clause 3: The method of any one of Clauses 1 and 2, wherein the UE performs the mobility procedure after detecting a RLF in the source RAT.

Clause 4: The method of any one of Clauses 1-3, wherein performing the mobility procedure comprises performing a RRC connection re-establishment procedure.

Clause 5: The method of Clause 4, further comprising: receiving an updated TA list in response to the TAU request.

Clause 6: The method of Clause 4, further comprising: receiving an RRC connection setup message if the target RAT is served by a different CN than the source RAT.

Clause 7: The method of Clause 4, wherein the RRC connection re-establishment procedure is performed using a S-TMSI.

Clause 8: The method of Clause 7, further comprising: receiving a SIB indicating the target RAT supports RRC connection re-establishment using an S-TMSI prior to performing the RRC connection re-establishment procedure using the S-TMSI.

Clause 9: The method of any one of Clauses 1-8, wherein the TAU request includes an update type indicating a handover from the source RAT to the target RAT.

Clause 10: The method of Clause 9, wherein the update type comprises an EPS update type access change.

Clause 11: A method of wireless communication by a network entity, comprising: transmitting a SIB indicating support of RRC connection re-establishment procedure of a UE between a target RAT and a source RAT, wherein one of the source RAT or target RAT is a TN RAT and the other is NTN RAT; and participating in the RRC connection re-establishment procedure with the UE to maintain a context established in a source RAT.

Clause 12: The method of Clause 11, wherein the UE comprises a CIoT wireless device.

Clause 13: The method of any one of Clauses 11 and 12, further comprising, if the target RAT is served by a different CN than the source RAT: receiving an RRC reestablishment procedure message transmitted by the UE; and transmitting a RRC connection setup message to the UE.

Clause 14: A method of wireless communication by a network entity, comprising: participating in a mobility procedure to transition a UE from a source RAT to a target RAT, wherein one of the source RAT or target RAT is a TN RAT and the other is a NTN RAT; retrieving a context of the UE from the source RAT; and forwarding data from the source RAT to the UE.

Clause 15: The method of Clause 14, wherein the UE comprises a CIoT wireless device.

Clause 16: The method of any one of Clauses 14 and 15, wherein the mobility procedure comprises a RRC connection re-establishment procedure.

Clause 17: The method of Clause 16, wherein the RRC connection re-establishment procedure is performed using a S-TMSI.

Clause 18: The method of Clause 17, wherein the S-TMSI is used to retrieve the context.

Clause 19: The method of Clause 16, further comprising: receiving a TAU request transmitted from the UE.

Clause 20: The method of Clause 19, wherein the TAU request includes an update type indicating a handover from the source RAT to the target RAT.

Clause 21: The method of Clause 20, wherein the update type comprises an EPS update type access change.

Clause 22: The method of Clause 20, further comprising: extracting a S-TMSI a in the TAU request.

Clause 23: The method of Clause 22, further comprising, if the S-TMSI is not found when performing a context retrieval: rejecting the TAU request or performing a backup TAU update with an update type other than the update type indicating the handover.

Clause 24: A processing system, comprising: a memory comprising computer-executable instructions; one or more processors configured to execute the computer-executable instructions and cause the processing system to perform a method in accordance with any one of Clauses 1-23.

Clause 25: A processing system, comprising means for performing a method in accordance with any one of Clauses 1-23.

Clause 26: A non-transitory computer-readable medium comprising computer-executable instructions that, when executed by one or more processors of a processing system, cause the processing system to perform a method in accordance with any one of Clauses 1-23.

Clause 27: A computer program product embodied on a computer-readable storage medium comprising code for performing a method in accordance with any one of Clauses 1-23.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a user equipment (UE), comprising:
    memory comprising instructions; and
    one or more processors configured, individually or in any combination, to execute the instructions and cause the apparatus to:
        perform a mobility procedure to establish a connection in a target radio access technology (RAT) while maintaining a context established in a source RAT, wherein one of the source RAT or target RAT is a terrestrial network (TN) RAT and the other is a non-terrestrial network (NTN) RAT; and
        send a tracking area update (TAU) request comprising one or more code points indicating a handover to the target RAT after establishing the connection in the target RAT.

2. The apparatus of claim 1, wherein the UE comprises a cellular Internet of Things (CIOT) wireless device.

3. The apparatus of claim 1, wherein the one or more processors are configured, individually or in any combination, to execute the instructions and cause the apparatus to perform the mobility procedure after detecting a radio link failure (RLF) in the source RAT.

4. The apparatus of claim 1, wherein the one or more processors are configured, individually or in any combination, to execute the instructions and cause the apparatus to perform the mobility procedure based on performing a radio resource control (RRC) connection re-establishment procedure.

5. The apparatus of claim 4, wherein the one or more processors are configured, individually or in any combination, to execute the instructions and cause the apparatus to receive an updated tracking areas (TA) list in response to the TAU request.

6. The apparatus of claim 4, wherein the one or more processors are configured, individually or in any combination, to execute the instructions and cause the apparatus to receive an RRC connection setup message if the target RAT is served by a different core network (CN) than the source RAT.

7. The apparatus of claim 4, wherein the one or more processors are configured, individually or in any combination, to execute the instructions and cause the apparatus to perform the RRC connection re-establishment procedure using a serving temporary mobile subscriber identity (S-TMSI).

8. The apparatus of claim 7, wherein the one or more processors are configured, individually or in any combination, to execute the instructions and cause the apparatus to receive a system information block (SIB) indicating the target RAT supports RRC connection re-establishment using the S-TMSI prior to performing the RRC connection re-establishment procedure using the S-TMSI.

9. The apparatus of claim 1, wherein the TAU request includes an update type indicating the handover from the source RAT to the target RAT.

10. The apparatus of claim 9, wherein the update type comprises an evolved packet system (EPS) update type access change.

11. An apparatus for wireless communication at a network entity, comprising:

memory comprising instructions; and one or more processors configured, individually or in any combination, to execute the instructions and cause the apparatus to:

transmit a system information block (SIB) indicating support of radio resource control (RRC) connection re-establishment procedure of a user equipment (UE) transitioning between a target radio access technology (RAT) and a source RAT, wherein one of the source RAT or target RAT is a terrestrial network (TN) RAT and the other is a non-terrestrial network (NTN) RAT;

receive from the UE after transitioning from the source RAT to the target RAT a tracking area update (TAU) request comprising one or more code points indicating a handover to the target RAT; and participate in the RRC connection re-establishment procedure with the UE to maintain a context established in the source RAT.

12. The apparatus of claim 11, wherein the UE comprises a cellular Internet of Things (CIOT) wireless device.

13. The apparatus of claim 11, wherein the one or more processors are configured, individually or in any combination, to execute the instructions and cause the apparatus to, if the target RAT is served by a different core network (CN) than the source RAT:

receive an RRC reestablishment procedure message transmitted by the UE; and transmit an RRC connection setup message to the UE.

14. An apparatus for wireless communication by at a network entity, comprising:

memory comprising instructions; and one or more processors configured, individually or in any combination, to execute the instructions and cause the apparatus to:

participate in a mobility procedure to transition a user equipment (UE) from a source radio access technology (RAT) to a target RAT, wherein one of the source RAT or target RAT is a terrestrial network (TN) RAT and the other is a non-terrestrial network (NTN) RAT;

receive from the UE after establishing a connection in the target RAT a tracking area update (TAU) request comprising one or more code points indicating a handover to the target RAT;

retrieve a context of the UE from the source RAT; and forward data from the source RAT to the UE.

15. The apparatus of claim 14, wherein the UE comprises a cellular Internet of Things (CIOT) wireless device.

16. The apparatus of claim 14, wherein the mobility procedure comprises a radio resource control (RRC) connection re-establishment procedure.

17. The apparatus of claim 16, wherein the RRC connection re-establishment procedure is performed using a serving temporary mobile subscriber identity (S-TMSI).

18. The apparatus of claim 17, wherein the S-TMSI is used to retrieve the context.

19. The apparatus of claim 14, wherein the TAU request includes an update type indicating the handover from the source RAT to the target RAT.

20. The apparatus of claim 19, wherein the update type comprises an evolved packet system (EPS) update type access change.

21. The apparatus of claim 19, wherein the one or more processors are configured, individually or in any combination, to execute the instructions and cause the apparatus to extract a serving temporary mobile subscriber identity (S-TMSI) a in the TAU request.

22. The apparatus of claim 21, wherein the one or more processors are configured, individually or in any combination, to execute the instructions and cause the apparatus to, if the S-TMSI is not found when performing a context retrieval:

reject the TAU request or performing a backup TAU update with an update type other than the update type indicating the handover.

\* \* \* \* \*